United States Patent
Hiraike et al.

[11] Patent Number: 5,995,718
[45] Date of Patent: Nov. 30, 1999

[54] INFORMATION PROCESSING APPARATUS WHICH SECURES AN EXCLUSIVE MEMORY FOR STORING A REGISTERED FONT AND METHOD THEREFOR

[75] Inventors: Koou Hiraike, Yokohama; Kunio Okada, Kawasaki; Yoji Furuya, Inagi; Yukimasa Sato, Yokohama, all of Japan

[73] Assignee: Canon Kabushiki Kaisha, Tokyo, Japan

[21] Appl. No.: 08/819,654

[22] Filed: Mar. 17, 1997

[30] Foreign Application Priority Data

Mar. 18, 1996 [JP] Japan .................................. 8-060831

[51] Int. Cl.⁶ .................................................... B41B 15/00
[52] U.S. Cl. ........................ 395/110; 395/115; 395/116; 395/117
[58] Field of Search ..................................... 395/102, 109, 395/110–117; 345/471; 358/296; 400/76; 711/170

[56] References Cited

U.S. PATENT DOCUMENTS

| 5,018,883 | 5/1991 | Fujita ...................................... 395/109 |
| 5,044,790 | 9/1991 | Kawamura .................................. 400/76 |
| 5,321,839 | 6/1994 | Murakami et al. ....................... 711/170 |
| 5,522,028 | 5/1996 | Nagata et al. ........................... 395/110 |
| 5,587,800 | 12/1996 | Miyazaki .................................. 358/296 |
| 5,708,768 | 1/1998 | Horiuchi et al. ........................ 345/471 |

FOREIGN PATENT DOCUMENTS

| 0575167A1 | 12/1993 | European Pat. Off. .......... G06F 3/12 |
| 0578264A2 | 1/1994 | European Pat. Off. ........ G06F 11/34 |
| 0684546A1 | 11/1995 | European Pat. Off. .......... G06F 3/12 |

*Primary Examiner*—Leo H. Boudreau
*Assistant Examiner*—Ishrat Sherali
*Attorney, Agent, or Firm*—Fitzpatrick, Cella, Harper & Scinto

[57] ABSTRACT

In an information processing apparatus for causing a printer to execute a printing operation by registering a font therein, there is disclosed a configuration allowing the information processing apparatus to manage the font to be registered in the printer thereby preventing the failure in the printing operation. The information processing apparatus issues a command for reserving a memory for font registration in the printer, then calculates the available capacity based on the reserved memory capacity at the transfer of the font to the printer, and executes transfer or deletion of the font based on thus calculated available capacity.

28 Claims, 18 Drawing Sheets

FIG. 6

$$\text{USED MEM CAPACITY} = \boxed{\begin{array}{c}\text{MEM CAPACITY REQUIRED}\\\text{TO REGISTER 1 FONT}\end{array}} + \sum_{k=1}^{n}\left(\boxed{\begin{array}{c}\text{MEM CAPACITY REQUIRED}\\\text{TO REGISTER 1 CHR}\end{array}} + \text{DATA SIZE}\right)$$

$$\text{REMAINING MEM CAPACITY} = \boxed{\begin{array}{c}\text{AVAILABLE CAPACITY}\\\text{OF REGISTRATION MEM}\end{array}} - \text{USED MEM CAPACITY}$$

3100

FIG. 12
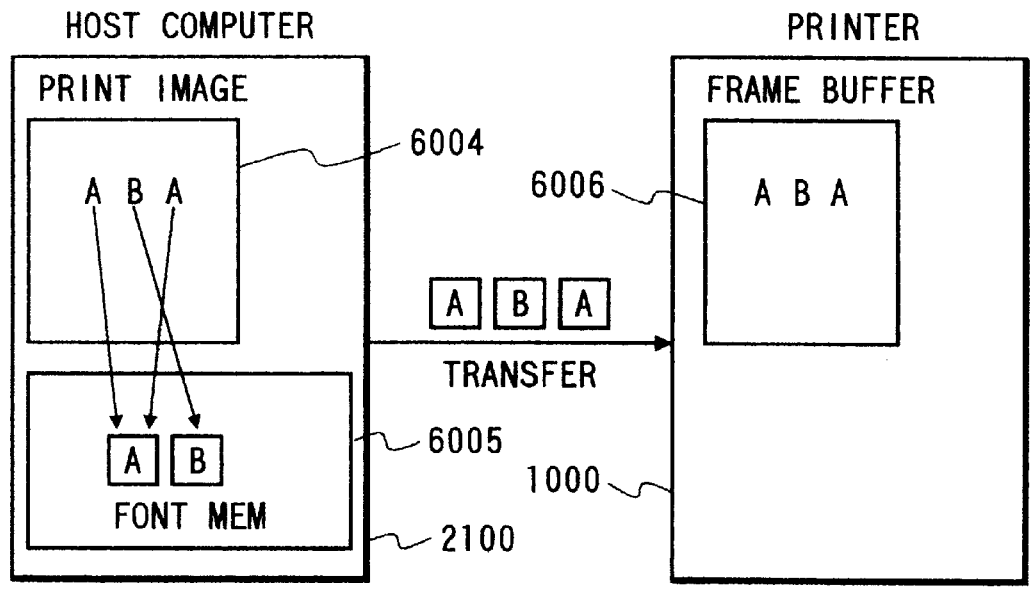
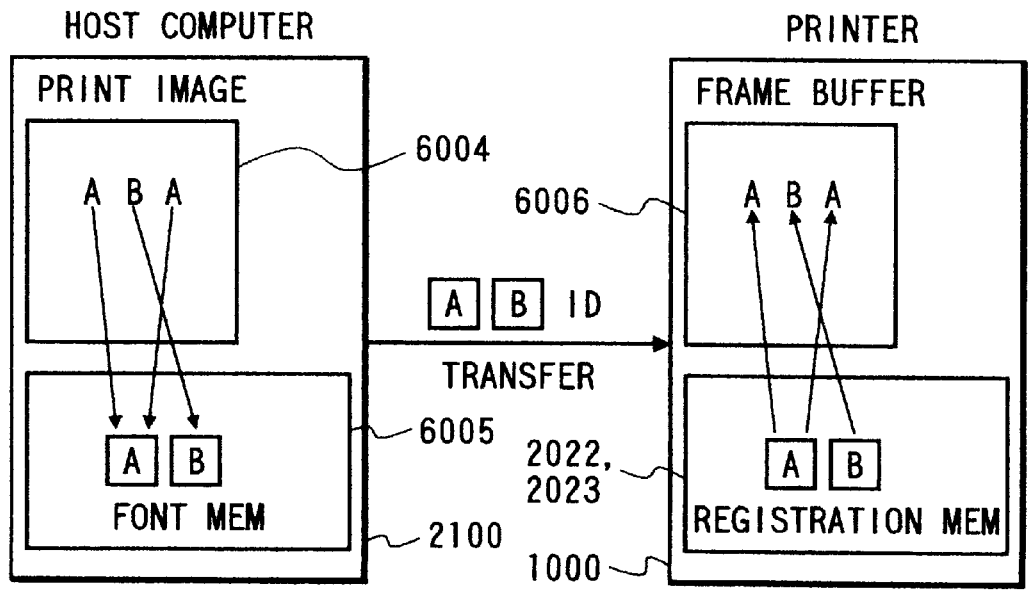

INFORMATION PROCESSING APPARATUS WHICH SECURES AN EXCLUSIVE MEMORY FOR STORING A REGISTERED FONT AND METHOD THEREFOR

BACKGROUND OF THE INVENTION

1. Field of the Invention

The present invention relates to an information processing apparatus connected to a printer engine for effecting printing operation based on an input command, an information processing method for such information processing apparatus, and a printing system including such information processing apparatus.

2. Related Background Art

In the conventional system of this kind, in registering a font in the printer, the host computer is not designed to recognize whether the necessary capacity is available in the registration memory of the printer.

Also the font is ordinarily registered in a volatile registration memory, but it is not customary to store a registered font in a non-volatile registration memory. And it is not customary to recognize the information of the registered font by the host computer if the font is registered in the non-volatile registration memory.

Also in case of storing a compressed registered font in the registration memory, it is customary to effect compression either in the host computer or in the printer, and it is not customary to share such compression by the host computer and the printer, or to execute the font registration based on the information on the frequency of usage of characters, stored in the host computer.

In the conventional apparatus, however, since the host computer is incapable of recognizing whether a capacity is available in the registration memory the registration process is continued even if the memory capacity is not available.

On the other hand, since the printer disregards the registration process after the memory capacity becomes full, the characters registered after the memory capacity becomes full, cannot be printed.

Also the font is ordinarily registered in a volatile registration memory and the registered font is erased when the power supply of the printer is turned off, so that the registered font cannot be utilized again.

Furthermore, in the storage of the compressed registration font in the registration memory, there result a drawback that the load of compression is entirely applied to the host computer or the printer since the compression is executed only in the host computer or in the printer, and another drawback that the registration memory cannot be effectively utilized since even the characters that are used only once in the print data are also registered in the printer.

SUMMARY OF THE INVENTION

In consideration of the foregoing, an object of the present invention is to secure an exclusive memory for storing the registered font in the printer, prior to the font registration, and to execute the font registration within the capacity of such exclusive memory.

Another object of the present invention is to recognize the registered font in the host computer, by registering the font in the non-volatile registration memory and returning the information on the registered font stored in the non-volatile registration memory from the printer to the host computer when the power supply to the printer is turned on.

Still another object of the present invention is, in case of font registration with compression, to share the compression by the host computer and the printer, and also to execute the font registration based on the information on the frequency of use of the characters.

Still another object of the present invention is to provide an apparatus capable of preventing the uncompleted font registration resulting from the deficiency in the available registration memory, of re-utilization of the font registered in the non-volatile registration memory, of reduction in the compression process time based on the shared compressing operation, and of efficient utilization of the registration memory based on the frequency of use of characters.

The above-mentioned objects can be attained, according to the present invention, by an information processing apparatus adapted to be connected to a printing device for effecting a printing operation based on entered commands, the apparatus comprising first means for issuing a command for securing a memory in the printing device for registering a font, second means for calculating the remaining memory capacity based on the memory capacity secured in the printing device and the memory capacity used in the font registration, third means for transferring font data to the printing device in case the remaining memory capacity is enough for the font registration, fourth means for issuing a command for deleting the font registered in the printing device in case the remaining memory capacity is insufficient for the font registration, and fifth means for transferring the character codes of a document to be printed, to the printing device.

The foregoing objects can also be attained, according to the present invention, by an information processing method for use in an information processing apparatus connected to a printing device for effecting a printing operation based on entered commands, the method comprising a first step of issuing a command for securing a memory in the printing device for registering a font, a second step of calculating the remaining memory capacity based on the memory capacity secured in the printing device and the memory capacity used in the font registration, a third step of transferring font data to the printing device in case the remaining memory capacity is enough for the font registration, a fourth step of issuing a command for deleting the font registered in the printing device in case the remaining memory capacity is insufficient for the font registration, and a fifth step of transferring the character codes of a document to be printed, to the printing device.

The foregoing objects can also be attained, according to the present invention, by a memory comprising:

a program for issuing a command for securing a memory in the printing device for registering a font;

a program for calculating the remaining memory capacity based on the memory capacity secured in the printing device and the memory capacity used in the font registration;

a program for transferring font data to the printing device in case the remaining memory capacity is enough for the font registration;

a program for issuing a command for deleting the font registered in the printing device in case the remaining memory capacity is insufficient for the font registration; and a program for transferring the character codes of a document to be printed, to the printing device.

BRIEF DESCRIPTION OF THE DRAWINGS

FIG. 6 is a view showing equations for memory calculation;

FIG. 12 is a view showing the configuration of a registered font between the host apparatus and the printer;

DESCRIPTION OF THE PREFERRED EMBODIMENTS

Figure 1:
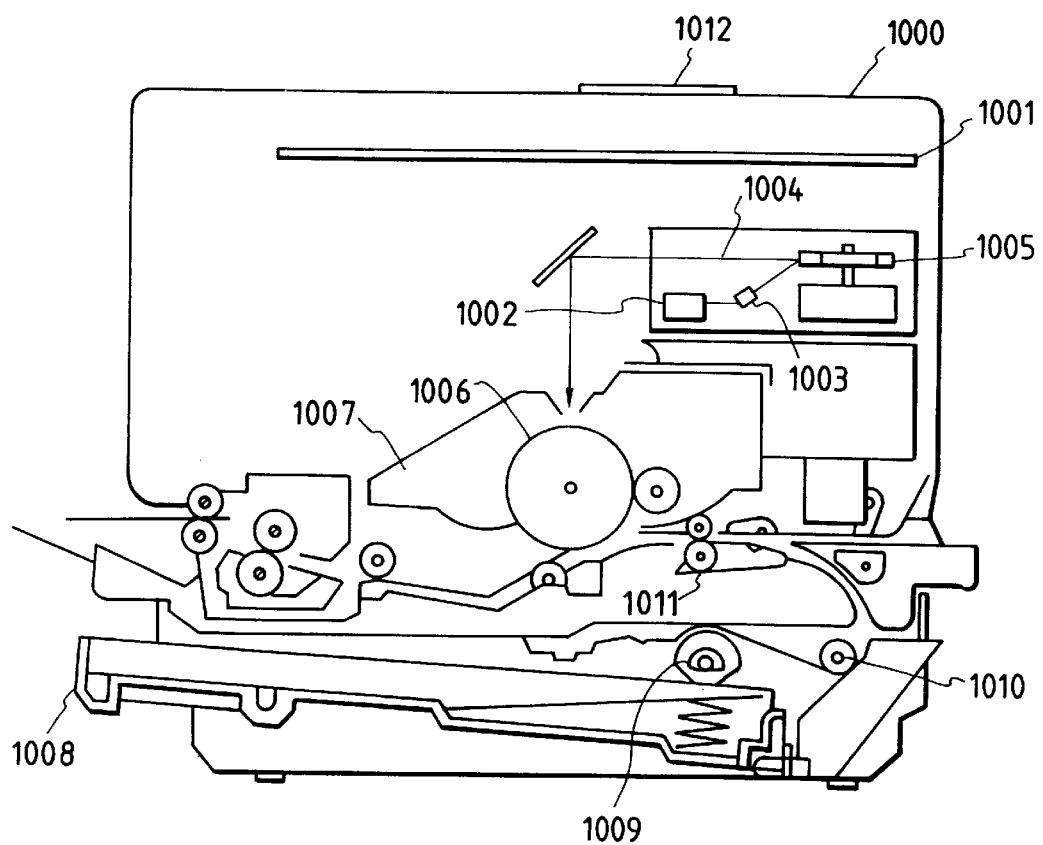
FIG. 1 is a cross-sectional view of an output device.

Prior to the description of the embodiments of the present invention, there will at first be explained, with reference to FIG. 1, the configuration of a laser beam printer adapted for use in the embodiments of the present invention. However such embodiments are applicable not only to a laser beam printer but naturally also to the printers of other types, such as an ink jet printer.

FIG. 1 is a cross-sectional view showing the configuration of a first output device, exemplified by a laser beam printer (LBP), to which the present invention is applicable.

Referring to FIG. 1, a main body 1000 of the LBP receives and stores print information (character codes etc.), form information and macro instructions supplied from an externally connected host computer, prepares a character pattern or a form pattern according to such information and forms an image on a recording medium such as recording paper. An operation panel 1012 is provided with switches for operations and an LED display device. A printer control unit 1001 controls the entire LBP 1000 and analyzes the character information etc. supplied from the host computer. The printer control unit 1001 executes conversion principally of character information into a video signal of the corresponding character patterns, for supply to a laser driver 1002, which drives a semiconductor laser 1003 and executes on-off switching of a laser light 1004 emitted from the semiconductor laser according to the input video signal. The laser light 1004 is deflected in the lateral direction by a rotary polygon mirror 1005 to scan the surface of an electrostatic drum 1006, whereby an electrostatic latent image of the character patterns is formed thereon. The latent image is developed by a developing unit 1007, provided around the electrostatic drum 1006, into a toner image, which is transferred onto the recording sheet. The recording sheet of a cut-sheet form is employed, is contained in a sheet cassette 1008 mounted in the LBP 1000, and is fed by a feed roller 1009 and transport rollers 1010, 1011 into the interior of the apparatus and to the electrostatic drum 1006. The LBP 1000 is provided with at least a card slot for connecting an option font card, in addition to the incorporated font, or a control card of a different language system (emulation card).

Figure 2:
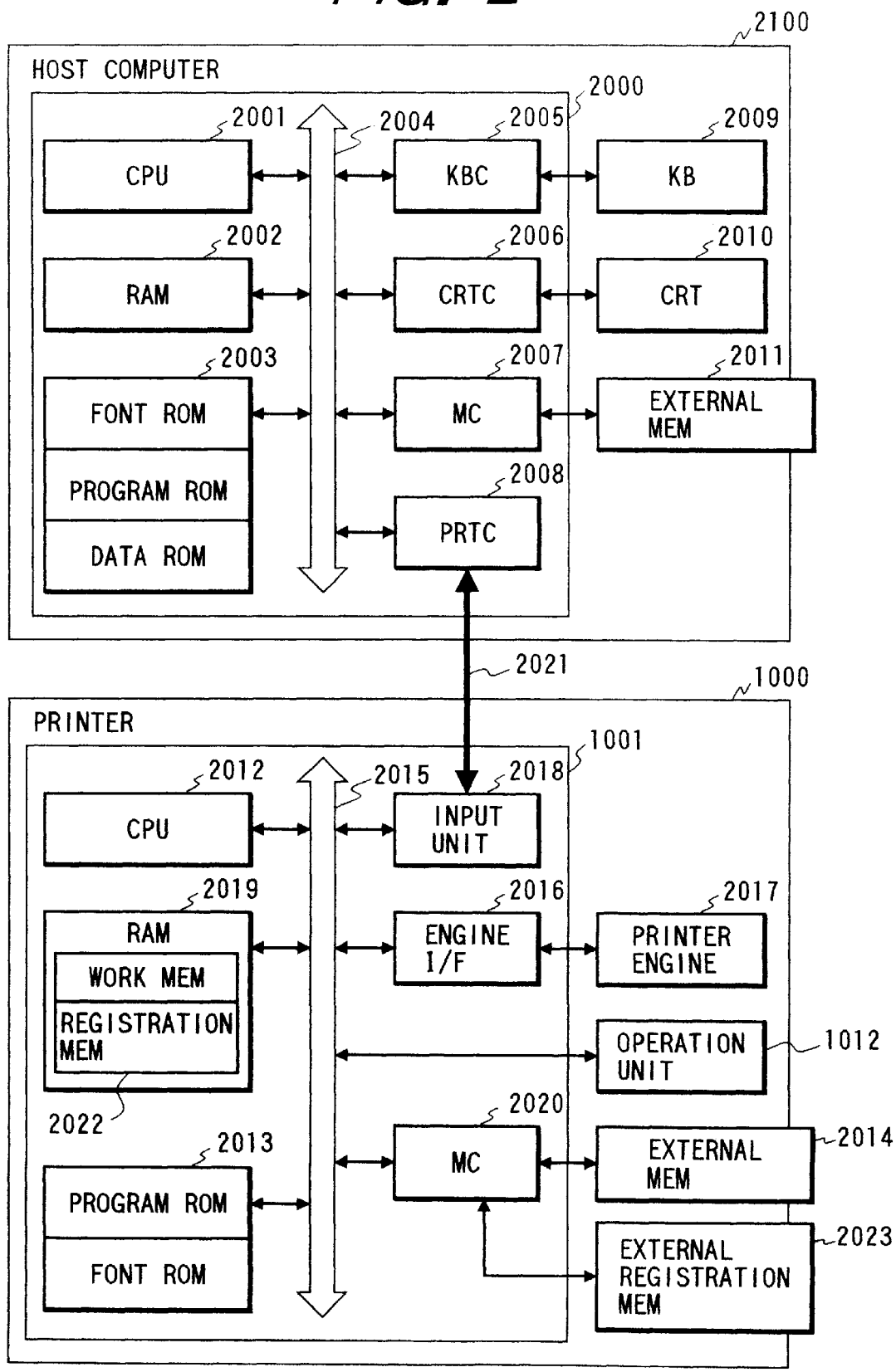
FIG. 2 is a block diagram showing the configuration of a printer control system.

FIG. 2 is a block diagram showing the configuration of a printer control system constituting an embodiment of the present invention.

In the following description, a laser beam printer as shown in FIG. 1 will be taken as an example. It is to be noted that the present invention is applicable not only to a single equipment but naturally also to a system consisting of a plural equipment or a system in which the process is executed through a network such as LAN, as long as the functions of the present invention are attained.

Also the present invention is naturally applicable to a case where the effects of the present invention are attained by the supply of a program to a system or an apparatus. In such case, a memory medium storing the program relating to the present invention constitutes the present invention, and such system or apparatus functions in the predetermined manner by reading the program from the memory medium.

Referring to FIG. 2, a host computer 2100 is provided with a CPU 2001 for effecting document processing for graphics, images, characters, tables (including table calculation) etc. based on a document processing program stored in a program ROM of a ROM 2003, and the CPU 2001 integrally controls the devices connected to a system bus 2004.

The program ROM of the ROM 2003 also stores control programs, including a program for the CPU 2001 corresponding to a flow chart to be explained later, and a font ROM in the ROM 2003 stores font data to be used in the document processing mentioned above. A RAM 2002 functions as a main memory, a work area etc. for the CPU 2001. A keyboard controller (KBC) 2005 controls inputs from a keyboard 2009 and an unrepresented pointing device. A CRT controller (CRTC) 2006 controls the display on a CRT display 2010. A memory controller (MC) 2007 controls access to an external memory 2011, such as a hard disk, a floppy disk etc. storing a boot program, various applications, font data, user files, editing files etc. A printer controller (PRTC) 2008 is connected to a printer 1000 through a predetermined bidirectional interface 2021 are executes a communication control process with the printer 1000. The CPU 2001 executes development (rasterization) of the outline font on a display information RAM defined on the RAM 2002, thereby enabling WYSIWYG on the CRT 2010. The CPU 2001 also opens various registered windows based on commands designated for example by an unrepresented mouse cursor on the CRT 2010 and executes various data processings.

In the printer 1000, a printer CPU 2012 integrally controls the access to various devices connected to a system bus 2015 according to a control program stored in a program ROM of a ROM 2013 or in an external memory 2014 and sends image signals as output information to a printing unit (printer engine) 2017 connected through an engine interface 2016. The program ROM of the ROM 2013 also stores a control program for the CPU 2012 corresponding to a flow chart shown in FIG. 3. Also a font ROM in the ROM 2013 stores font data to be used in the generation of the output information mentioned above, and a data ROM in the ROM 2013 stores information to be used on the host computer in case of a printer not provided with the external memory 2014 such as a hard disk. The CPU 2012 is rendered capable of communication with the host computer through an input unit 2018, thus being capable of informing the host computer 2100 for example of the information of the printer. A RAM 2019, serving as a main memory, a work area etc. of the CPU 2012, is rendered expandable in capacity by an option RAM to be connected to an unrepresented expansion port. The RAM 2019 is used for an area for developing the output information (frame buffer) and an area for storing environmental data.

The RAM 2019 is also partly assigned as a registration memory 2022 for registering font etc.

An external registration memory 2023, which is an external memory for registering font etc., is composed of a non-volatile memory such as a hard disk (HD) or a flush memory, and the access is controlled by a memory controller (MC) 2020.

The access to the external memory 2014 such as the hard disk (HD) or the IC card mentioned above is controlled by the memory controller (MC) 2020. The external memory 2014 is connected as an option, and used for storing font data, an emulation program, form data etc. 2018 indicates the operation panel mentioned in the foregoing and provided with operation switches, LED display etc.

Also the above-mentioned external memory is not limited to one unit but may be provided with at least one unit. More specifically there may be connected a plurality of optional font cards, external memories storing programs for interpreting the printer control languages of different language systems etc. Furthermore there may be provided an unrepresented NVRAM for storing printer mode setting information from the operation panel 1012 and a registered font to be explained later.

Figure 3:
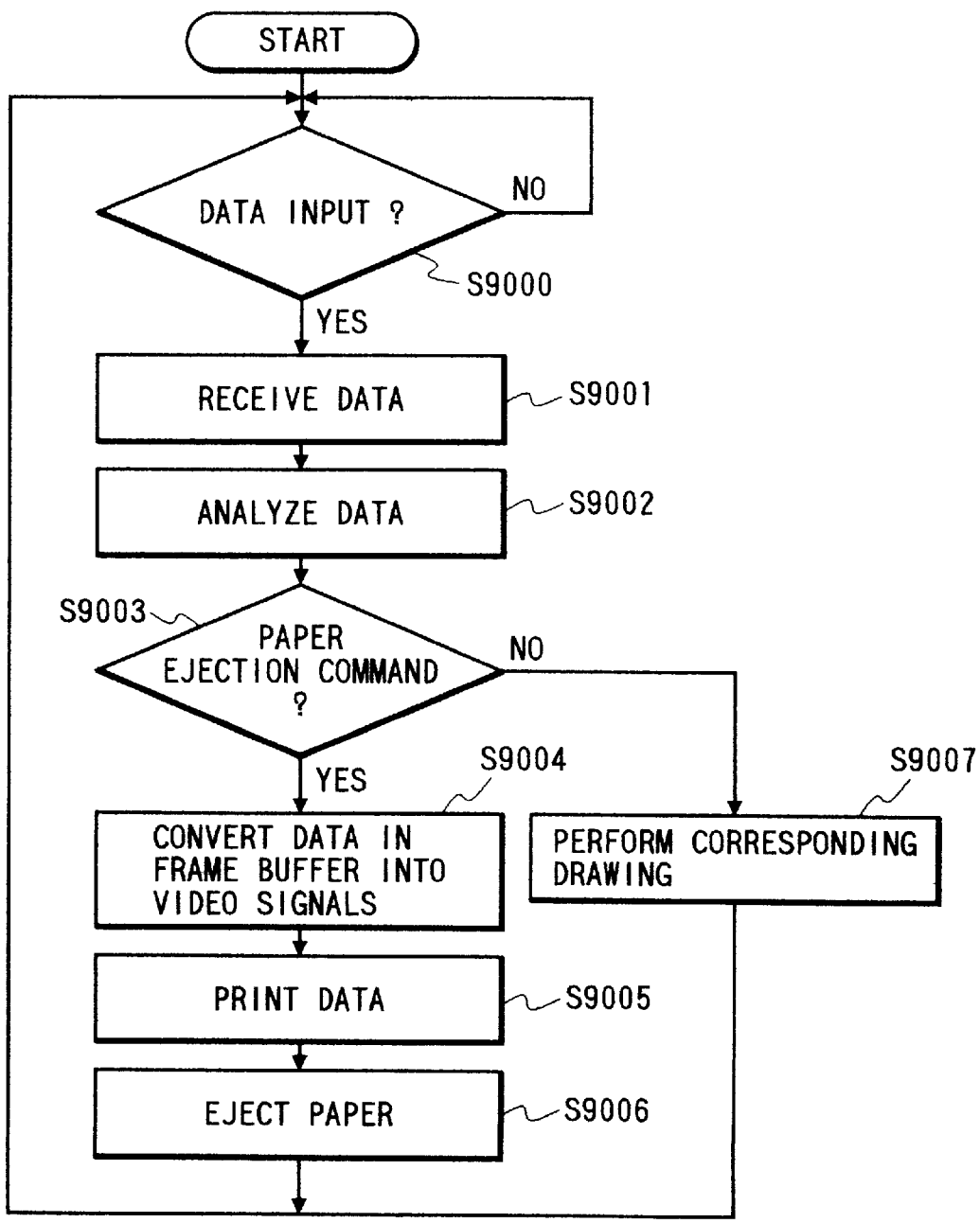
FIG. 3 is a flow chart showing the outline of the process in a printer.

In the following the outline of the process in the printer will be explained with reference to a flow chart in FIG. 3. When data are transferred from the host apparatus, the printer terminates a data input waiting state (step 9000) and executes a data input process (step 9001). Then it analyzes the input data (step 9002) and executes a process according to the received command. In case a sheet ejection command is identified (step 9003), it converts the content of the frame buffer into a video signal (step 9004), then executes printing by transferring the video signal to the printer engine (step 9005) and ejects the recording sheet (step 9006). In case of another command, it executes for example a drawing process according to such command (step 9007) and generates a printing image in the frame buffer.

In the following there will be explained, with reference to FIGS. 4, 5 and 6, a method of securing an exclusive registration memory in the printer at the font registration and a method of calculating the remaining capacity of the exclusive registration memories in the host and in the printer.

The host computer 2100 (hereinafter simply written as host) and the printer 1000 are connected with a bidirectional I/F cable 2021. At first the host issues a printer status request command 3001, in response to which the printer returns, to the host, the available capacity 3002 of registration memories 2022, 2023, a memory capacity 3003 required for registering a font and a memory size 3004 required for registering a character, as information relating to the character registration (FIG. 4).

Figure 5:
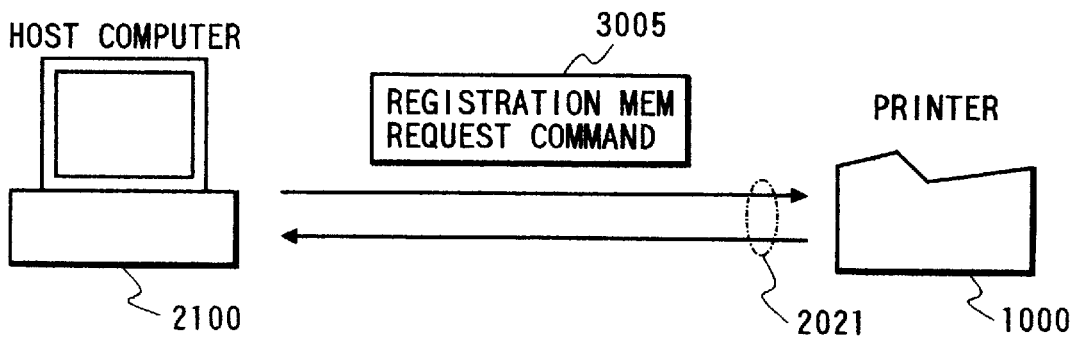

Based on the available capacity information 3002 of the registration memories returned to the host, the host determines the memory capacity and the memory (volatile memory 2022 or non-volatile memory 2023) to be used for the font registration, and issues a registration memory request command 3005 for reserving such memory capacity (FIG. 5).

Upon identifying such command, the printer reserves such memory capacity in the registration memory.

The host memorizes the capacity of the registration memory designated by the registration memory request command 3005, and executes the font registration within such capacity of the registration memory.

In such registering operation, the host from time to time calculates the remaining capacity of the registration memories 2022, 2023 of the printer, based on the capacity information of the registration memories and utilizing calculation formulas 3100 shown in FIG. 6.

In determining the memory capacity to be used for the font registration, the host may determine to use all the available capacity of the registration memories 2022, 2023 or to use a part of such available capacity, and, in the latter case, the host user may arbitrarily designate the capacity of the registration memories 2022, 2023 to be used or the host automatically calculates the percentage of the available capacity of the registration memories 2022, 2023.

The reservation of the registration memory may be made by the issuance of the registration memory request command 3005 at the start of the print data, or in the course of such print data.

Also the release of the registration memory may be made either automatically by the printer at the end of the print data, or by the issuance of a registration memory release request command by the host to the printer at the end or in the course of the print data.

Figure 4:
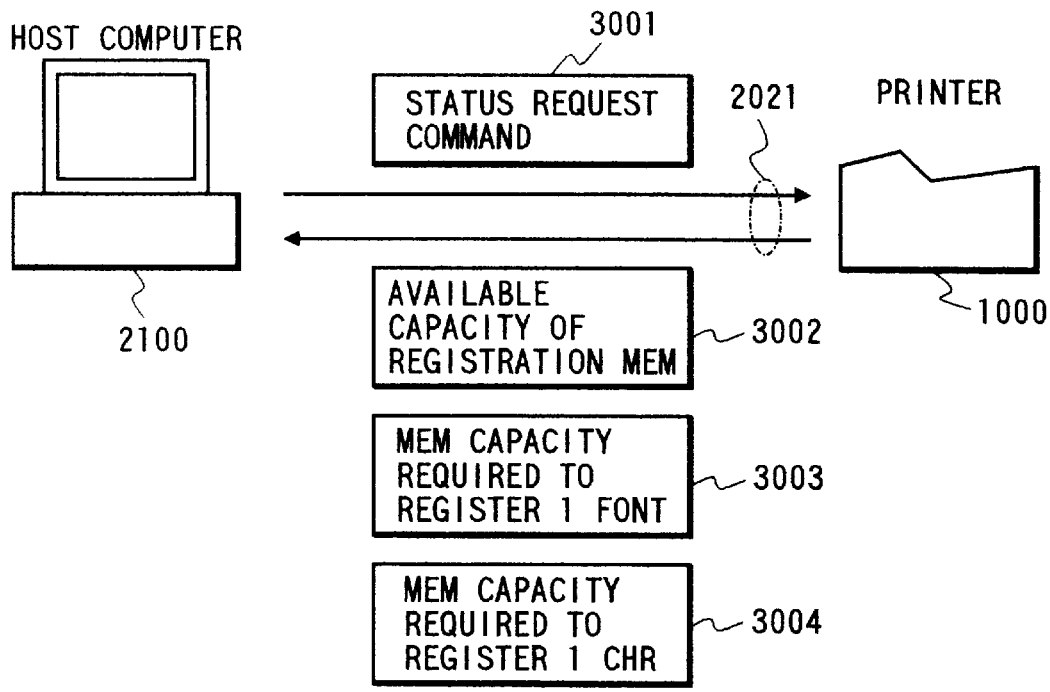
FIGS. 4 and 5 are views showing the command configuration between a host apparatus and a printer.
Figure 7:
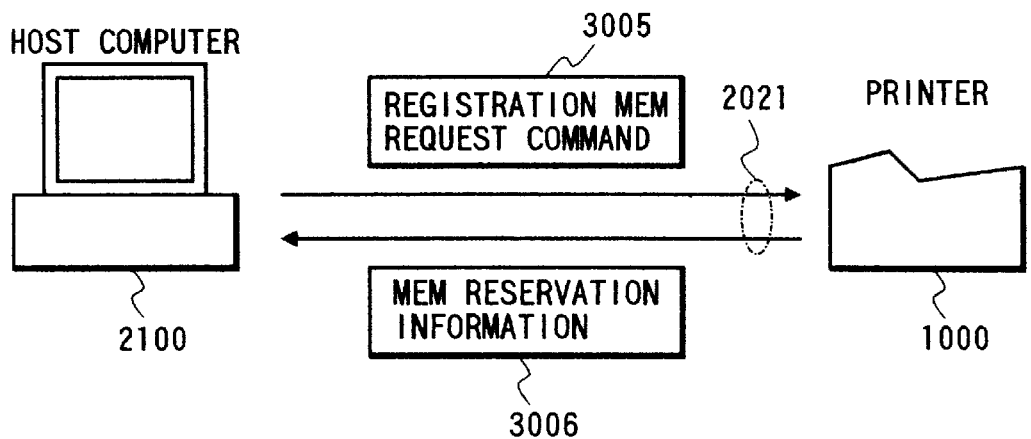
FIGS. 7 and 8 are views showing the command configuration between a host apparatus and a printer.

In configurations shown in FIGS. 4 and 5, the host determines the reserved capacity in the registration memory, based on the available capacity information 3002 returned by the printer. In FIG. 7, there will be explained a method of issuing the registration memory request command 3005 from the host to the printer, regardless whether the available capacity information 3002 is present or not.

At first the host determines the memory capacity to be used in the font registration, without issuing the printer status request command 3001, and issues the registration memory request command 3005 in order to reserve such memory capacity.

Upon identifying such command, the printer secures the memory capacity in the registration memory.

In this method, the reservation of the registration memory may fail due to deficiency in the available capacity of the memory in the printer, since the host arbitrarily determines the memory capacity to be reserved without consideration of the available capacity in the registration memories of the printer.

Therefore, in response to the registration memory request command issued by the host, the printer effects reservation of the registration memory, and then returns, to the host, registration memory reservation information 3006 indicating whether the registration memory has been successfully reserved, or, in case the memory capacity designated by the registration memory request command 3006 could not be reserved but a partial capacity could be reserved, indicating the reserved memory capacity.

Based on the information 3006, if the registration memory could be reserved, the host executes the font registration within such reserved memory capacity.

If the reservation of the registration memory could not be made at all, the font registration is not executed.

On the other hand, if the memory capacity designated by the registration memory request command 3005 could not be reserved but could only partly be reserved, the font registration is executed within thus reserved memory capacity.

The host determines the memory capacity either by arbitrarily designating the capacity of the registration memories 2022, 2023 to be used by the host user or by using fixed information indicating the amount of memory required for registration, stored in advance in the host.

Figure 8:
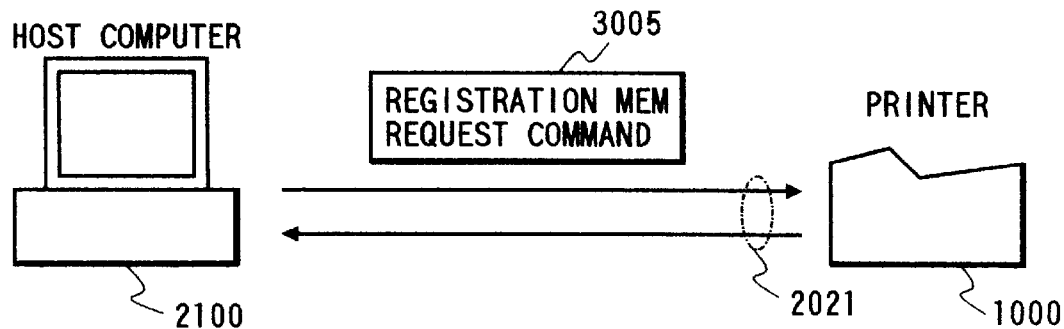

In contrast to the configuration shown in FIG. 7 in which the reservation information 3006 for the registration memory is returned from the printer to the host, FIG. 8 shows a case in which such information 3006 is not returned to the host.

The operations of issuance of the registration memory request command 3005 by the host and the memory reservation by the printer are same as in the case of FIG. 7.

The present configuration is however different in that the reservation information 3006 for the registration memory is not returned to the host.

In this case the font registration is unilaterally executed from the host to the printer, regardless whether the registration memory could be reserved and regardless of the reserved memory capacity.

Figure 9:
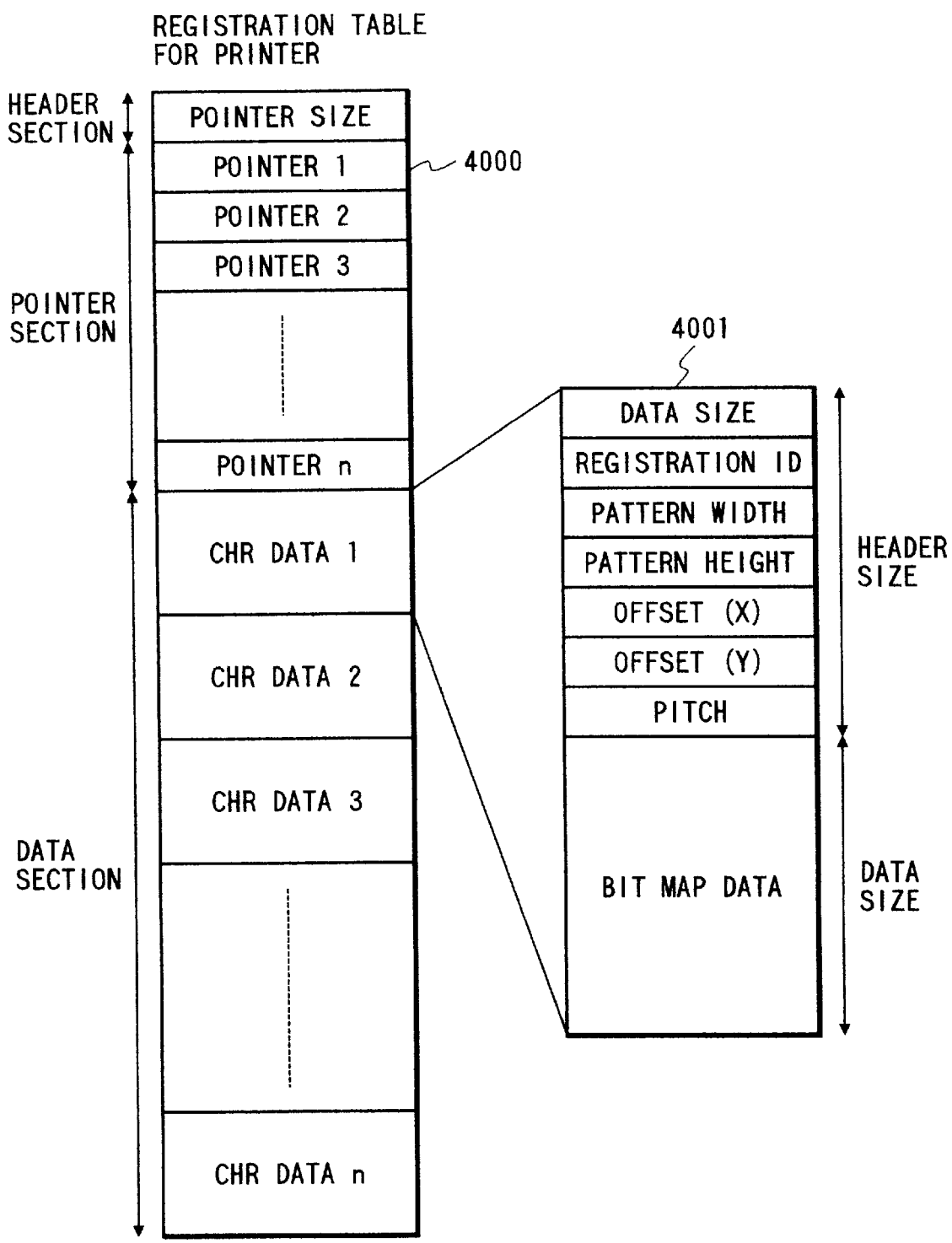
FIG. 9 is a view showing the configuration of a registration table in the printer.

FIG. 9 shows a registration table to be used by the printer at the font registration.

The registration table 4000 is generated in the registration memories 2022, 2023, and is composed of a header section, a pointer section and a data section. The header section stores the number of the registered characters, and the pointer section stores a pointer value for the character data.

Character data 4001 are composed of the size (byte number) of bit map data, a registration ID which is a number for identifying the registered character, width and height of the bit map, offset values (in X and Y directions) from the designated print position to the upper left corner of the bit map, a character pitch, and bit map data (binary data). These information are given as parameters of a character registration command from the host computer 2100. In the present example, the character code is used as the registration ID.

Figure 10:
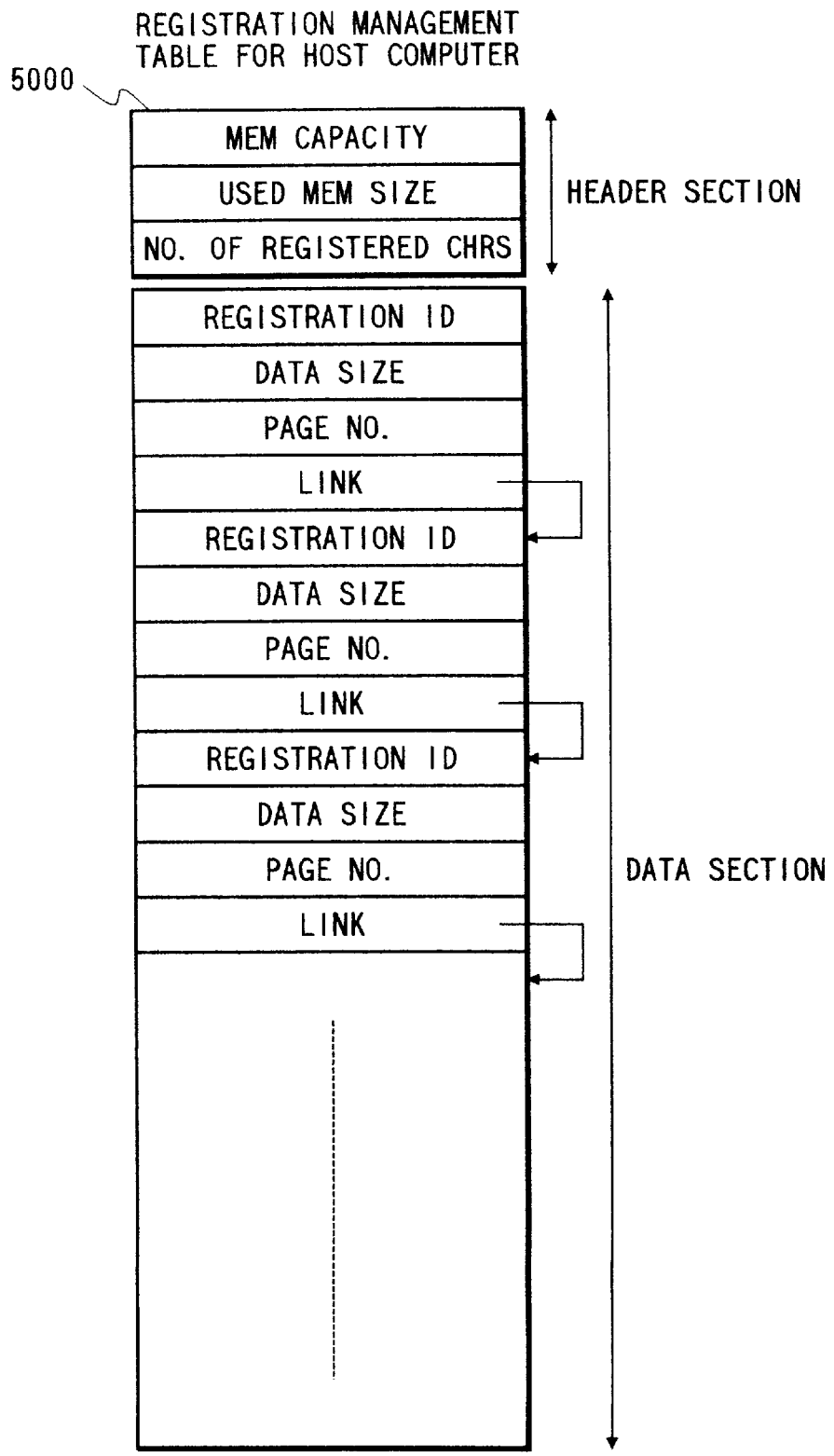
FIG. 10 is a view showing the configuration of a registration management table in the host apparatus.

FIG. 10 shows the structure of a registration management table in the host.

The registration management table 5000 in the host is used for storing the character code and the size of the data stored in the printer, and is composed of a header section and a data section. The header section stores the total size of the registration memories in the printer, and the memory size and the number of the registered characters used in the current registration.

The data section is composed of data of the characters, mutually linked by pointers. The data of each character are composed of a registration ID, the size of the character data 4001 in the printer, a page number where the data are last referred to, and a link which is a pointer to the next data. The page number indicates the ordinal number of page within a printing job (within a file).

Figure 11:
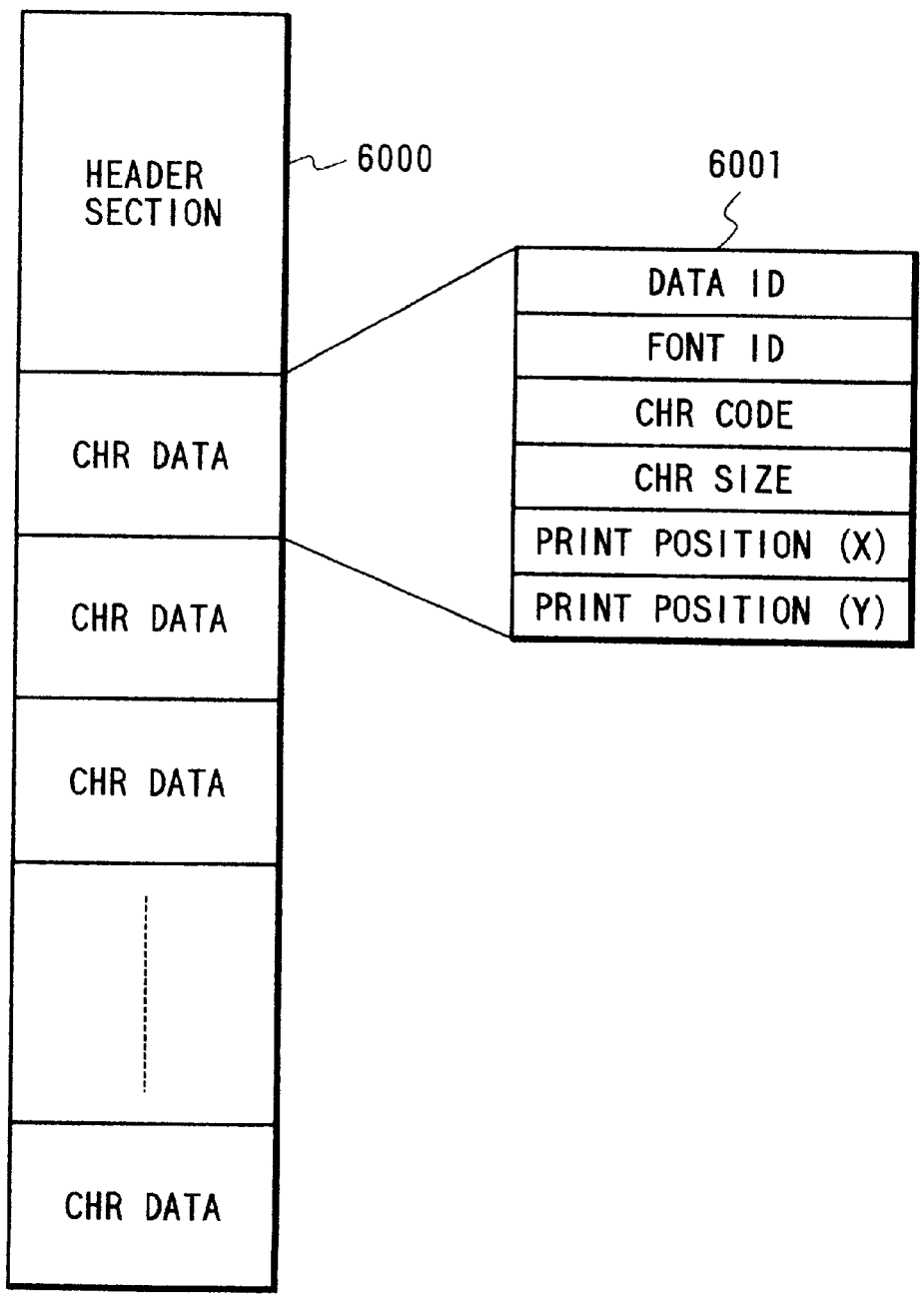
FIG. 11 is a view showing the configuration of a document file in the host apparatus.

FIG. 11 shows the structure of a print document file in the host.

The document file 6000 is composed of a header section and a data section, and the header section stores information required in the host at the printing. The data section is composed of data of the characters. The data 6001 of each character contain a data identifier, a font ID for identifying the font, a character code, a character size and a print position (coordinate). At the printing operation, the host determines the font, the character size and the character print position by referring to the above-explained file, and sends commands to the printer.

Now reference is made to FIG. 12 for explaining the effect of registration. In case the registration is not conducted, the host computer prepares a print image 6004 on a memory. The print image is in fact a file of the format as shown in FIG. 11, and indicates the size, font and position of the print on the sheet. The font data actually used in the printing are stored in a font memory 6005. In the printing operation, the font data (bit map data) are transferred to the printer 1000 while the print image 6004 is used as reference, and the printer develops the transferred bit map data on a frame buffer 6006 in the RAM 2019.

In case the registration is conducted, the print image 6004 and the font memory 6005 in the host computer are same as those in the above-explained case. In the printing operation, the host registers the bit map in the printer and, in case of printing a same character, it transfers the character only.

The printer stores the bit map in the registration memories 2022, 2023, and generates the frame buffer 6006 by referring to the bit map in the registration memories. Therefore, in case of printing a same character again, there is only required to resend the registration ID but not the bit map.

Figure 13:
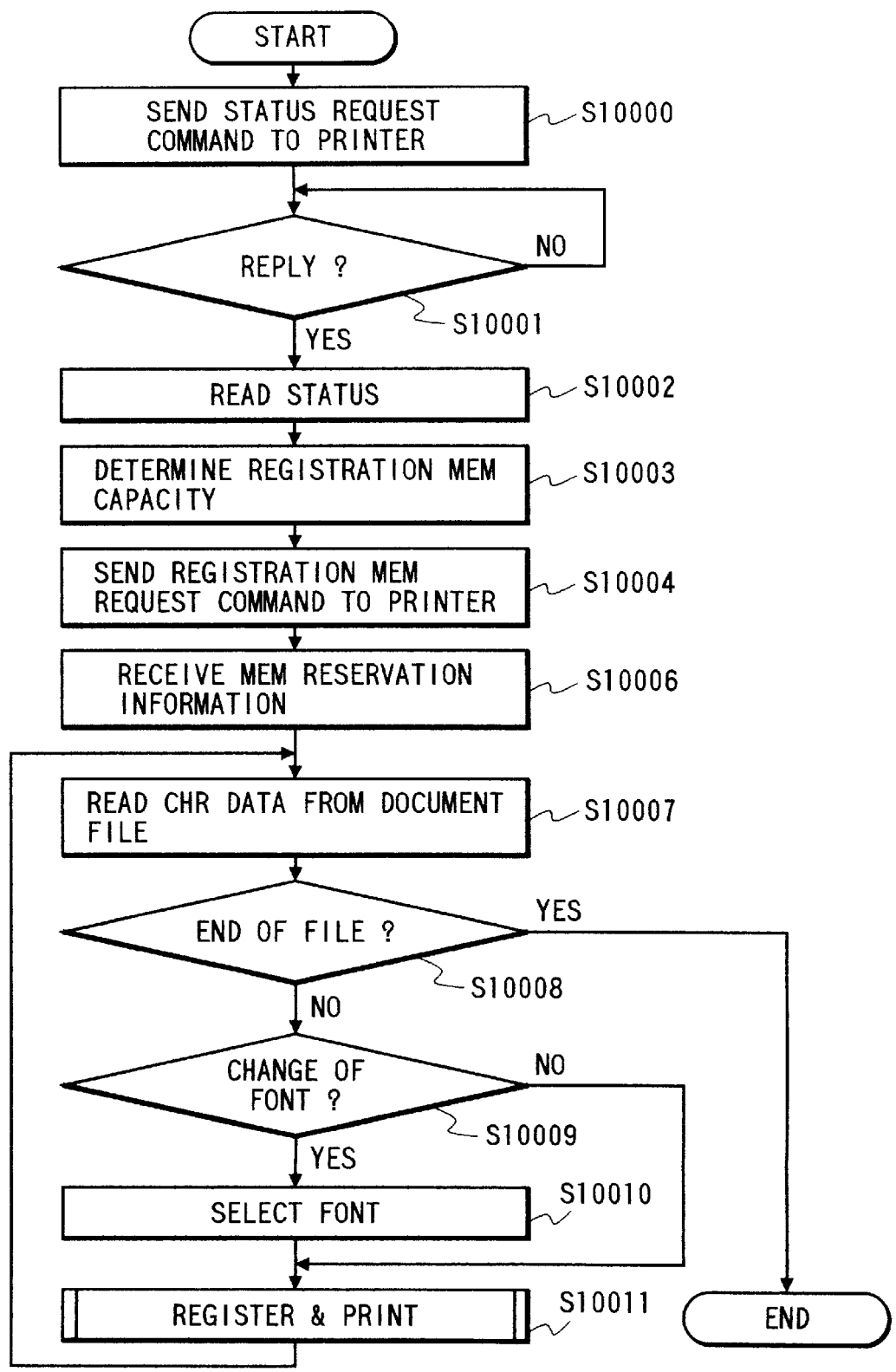
FIG. 13 is a flow chart showing the outline of the printing process in the host apparatus.

FIG. 13 is a flow chart showing the outline of the printing operation in the host computer.

When a printing operation is designated, the host at first sends a status request command to the printer (step 10000), then awaits the return to the status from the printer (step 10001), and, when the status is returned, it reads the status (step 10002) thereby storing various information in the host.

In the configurations shown in FIGS. 7 and 8, the sequence starts from a step 10003, skipping the steps 10000 to 10002 explained above.

The step 10003 determines the memory capacity to be reserved as the registration memory, either by calculating the capacity for registration from the available capacity information 3002 of the registration memory returned from the printer in the step 10002 or by arbitrary setting, as already explained in relation to FIGS. 4, 5, 7 and 8.

It is also possible to Judge whether or not to reserve the registration memory according to the size of the print data, and, in case of reserving the registration memory, to automatically calculate the capacity of the registration memory from the size of the print data.

Also the registration memories (volatile memory 2022 and non-volatile memory 2023) may be set by arbitrary selection by the host user or by a stepwise shift, for example by storing the registered font preferentially in the volatile memory and then in the non-volatile memory when the volatile memory becomes full.

In a step 10004, the host sends the registration memory request command 3005 to the printer, based on the registration memory capacity determined in the step 10003.

In response, the printer reserves the registration memory according to the command.

After the reservation of the registration memory, the printer returns, to the host, the reservation information 3006 of the registration memory, indicating whether the memory reservation has been successful and the number of bytes of the reserved memory. A step 10006 receives the returned reservation information 3006.

Based on such reservation information, the host sets again the registration capacity at the actual character registration.

However, the process of the step 10006 mentioned above is skipped in case of the configuration shown in FIG. 8.

Then the host reads the character data 6001 from the document file 6000 (step 10007), and, if the document file is entirely covered, the sequence is terminated (step 10008).

On the other hand, if the document file has not been covered, there is discriminated whether the font has been changed (step 10009), and, if not, there are executed the font selection according to the command (step 10010) and the registration process (step 10011).

Thereafter the process starting after the step 10007 is repeated until the file is entirely covered.

Figure 14:
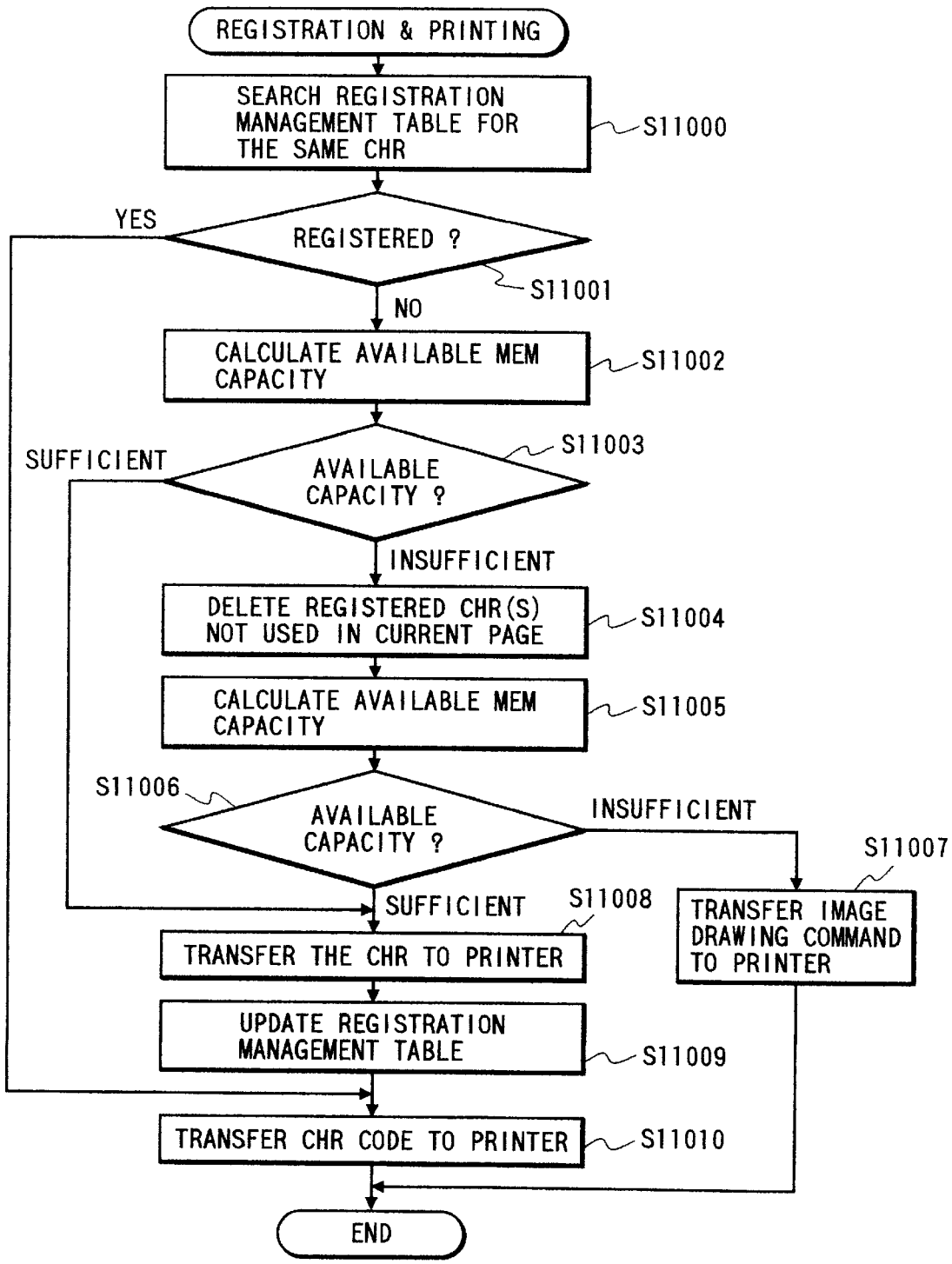
FIG. 14 is a flow chart showing the details of the registration process in the host apparatus.

FIG. 14 is a flow chart showing the details of the registration process in the step 10011.

At first the registration management table 5000 is searched (step 11000) to discriminate whether a same character has been registered (step 11001).

If registered, the sequence proceeds to a step 11010.

On the other hand, if not registered, there is calculated the available memory capacity after the registration (step 11002). If the available capacity is identified as deficient, the registration management table 5000 is searched to find registered characters belonging to a page preceding the currently prepared page, and a registered character deletion command is issued for the corresponding registered characters to delete such characters from the registration memories 2022, 2023 (step 11004).

The deletion of the registered characters may be conducted in such a manner as to delete all the characters meeting the above-mentioned condition or to effect the deletion of the characters stepwise until a capacity required for the new character registration becomes available.

If a step 11003 judges that a sufficient capacity is available, the sequence proceeds to a step 11008 without effecting the deletion of the registered characters.

A step 11005 again calculates the available capacity, and, if it is deficient, the registration process is not executed but an image drawing command and bit map data are transferred to cause the printer to draw the image (step 11007).

On the other hand, if a step 11006 judges that the available capacity is sufficient a character is transferred to the printer (step 11008) and the registration management table is renewed (step 11009).

A step 11010 transfers a character code together with a character print command to the printer, which in response executes the printing process for the registered character.

As explained in the foregoing, it is rendered possible to prevent the failed registration of the font resulting from the memory deficiency, by reserving an exclusive registration memory in the printer prior to the font registration.

Second Embodiment

In a second embodiment of the present invention, there will be explained a configuration of securing a registration memory area individually according to the purpose of use of the registered font, at the reservation of the registration memory.

Figure 15:
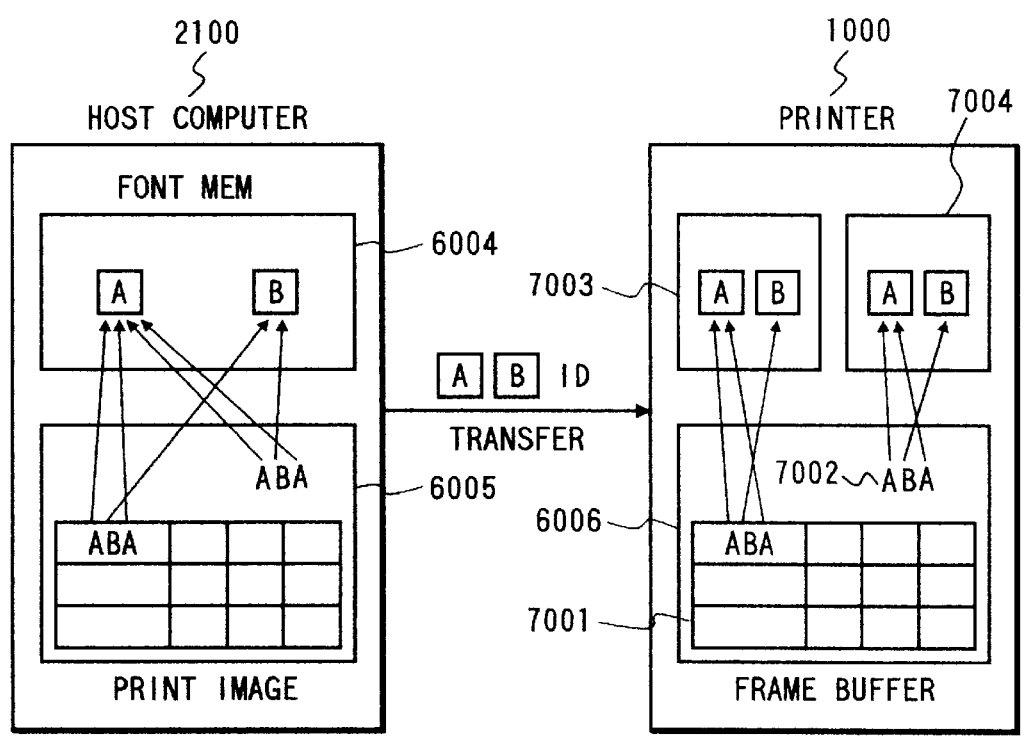
FIG. 15 is a view showing the configuration of the registered font between the host apparatus and the printer.

The present embodiment, which will be explained with reference to FIG. 15, provides a configuration of individually reserving a registration memory exclusive for the form, a registration memory exclusive for ordinary print etc. in case a form is employed in the printing operation.

The process in the host is same as shown in FIG. 12 in the foregoing first embodiment.

The present embodiment is different in that the printer separately reserves a registration memory 7003 for registering characters used in a form 7001, and a registration memory 7004 for registering characters used in an ordinary print 7002.

The data processing in the present embodiment will be explained with reference to a flow chart shown in FIG. 13.

The data processing in the steps from 10000 to 10002 and from 10006 to 10011 is same as that in the foregoing first embodiment.

The present embodiment is however different in the steps 10003 and 10004. At the font registration, the host judges the ordinary printing, the form printing etc. and determines the capacity of the registration memory for such ordinary printing or form printing (step 10003), and issues the registration memory request command (step 10004), in response to which the printer executes the reservation of the exclusive registration memories.

However, as in the foregoing first embodiment, there may also be adopted the configuration shown in FIGS. 4, 5, 7 or 8.

It is also possible to reserve each of the registration memories, to be reserved individually according to the purpose of use, individually when each registered font becomes necessary and to release each of the registration memories when such registered font becomes unnecessary.

Such individual reservation of the registration memories according to the purpose of use of the registered fonts enables efficient use of the registration memories.

Third Embodiment

In a third embodiment of the present invention, in case the registration memory cannot be reserved on the volatile memory 2022, composed for example of a RAM, the registered font stored in such volatile memory is diverted to the non-volatile memory 2023, composed for example of a hard disk of a flush memory, whereby an empty capacity is formed on the volatile memory and the font registration is executed therein.

Figure 16:
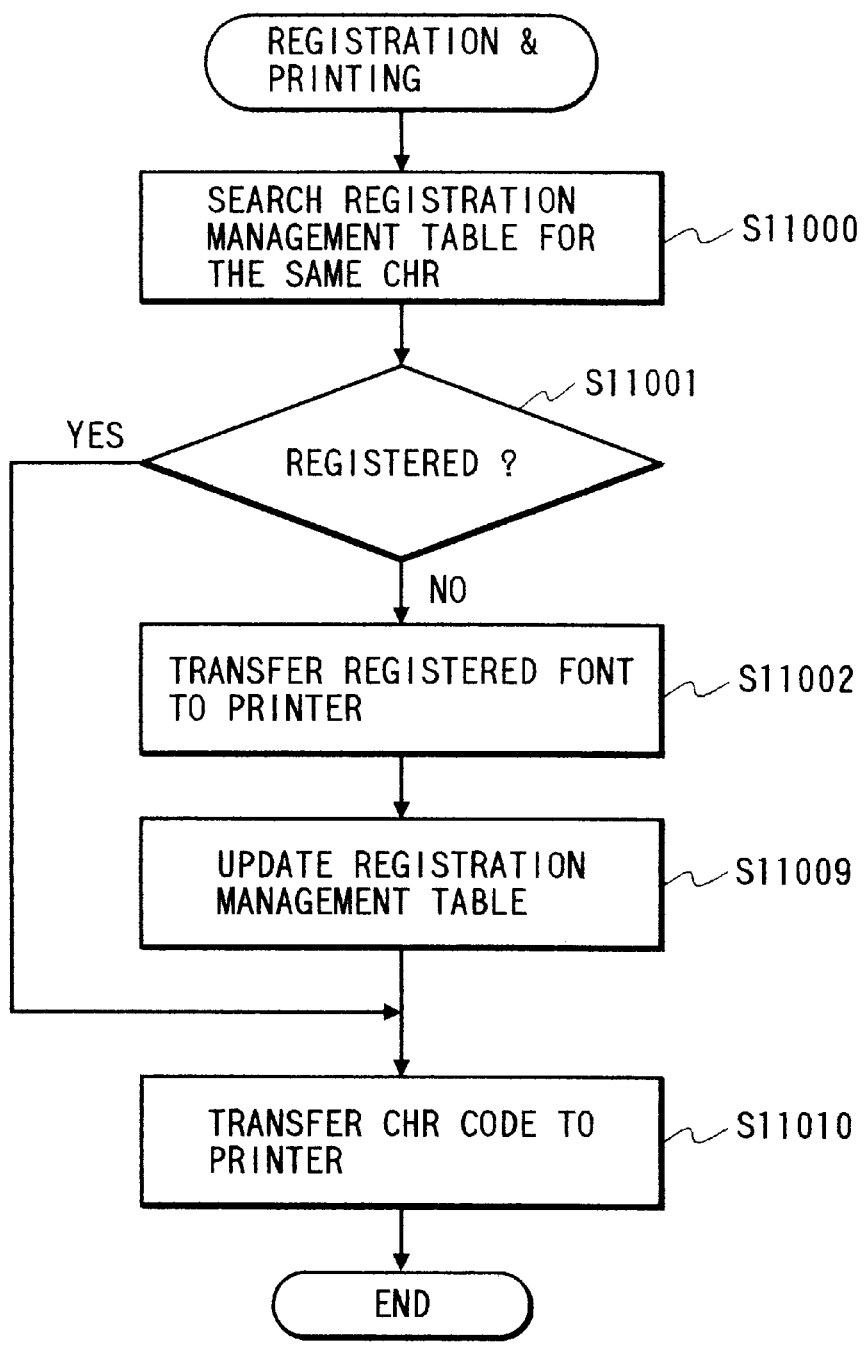
FIG. 16 is a flow chart showing the details of the registration process in the host apparatus.

The registration process of the host in this embodiment will be explained with reference to a flow chart shown in FIG. 16. A program corresponding to such flow chart is stored in the ROM 2003 and is executed by the CPU 2001.

The data processing in the steps from 11000 to 11001 and from 11009 to 11010 is same as that in the foregoing first embodiment.

It is however in a step 11002, in which the printer diverts the registered font, stored in the volatile memory 2022, to the non-volatile memory 2023.

Figure 17:
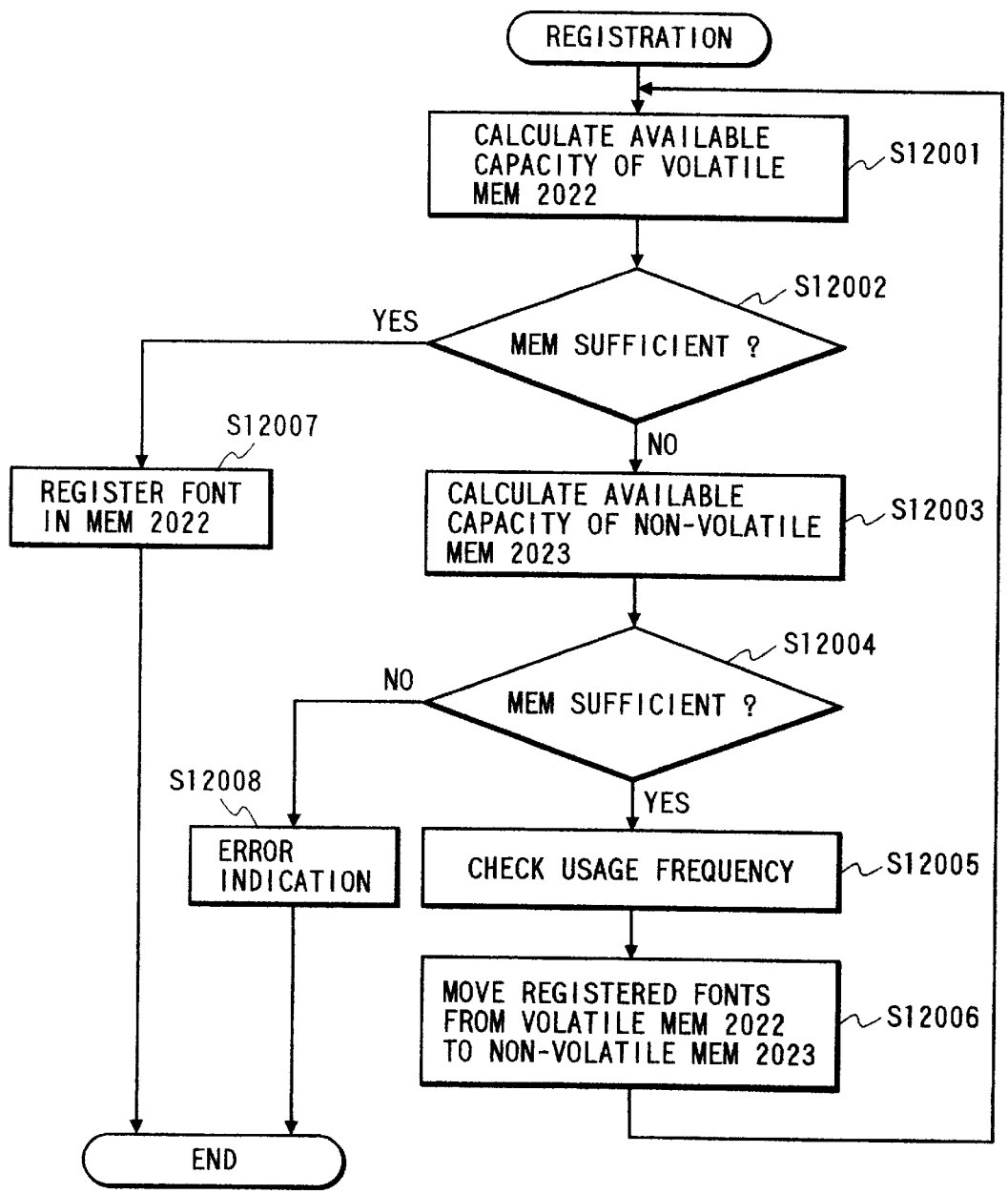
FIG. 17 is a flow chart showing the details of a deviation process in the printer.

Now there will be explained, with reference to a flow chart shown in FIG. 17, the registration process in the printer in case the registered font is transferred to the printer in the step 11002. A program corresponding to the flow chart is stored in the ROM 2013 and is executed by the CPU 2012.

A step 12001 calculates whether the volatile memory 2022 has an available capacity sufficient for the font registration, and, if a step 12002 judges that the volatile memory has a sufficient available capacity, the font registration is executed on the volatile memory (step 12007) and the sequence is terminated.

On the other hand, if the step 12002 judges that the capacity is not available on the volatile memory, a step 12003 discriminates whether a capacity is available on the non-volatile memory, and, if not, the failure in the registration is displayed on the printer (step 12008) and the sequence is terminated. It is also possible to utilize a bidirectional interface, thereby causing the CRT 2010 to display that proper printing cannot be achieved because of the failure in the registration.

The sequence may also be terminated in the step 12008 without the display of the error.

If the step 12004 judges that the capacity is available, there is checked the frequency of use of the registered fonts stored in the volatile memory, based on the registration table 8000 (FIG. 18) (step 12005), and such fonts are moved to the non-volatile memory in the increasing order of the frequency of use (step 12006).

Subsequently the process after the step 12001 is repeated until the completion of the registration by reserving the necessary capacity on the volatile memory or until the reversation of the capacity on the volatile memory is judged as impossible because of the deficiency of the non-volatile memory.

Figure 18:
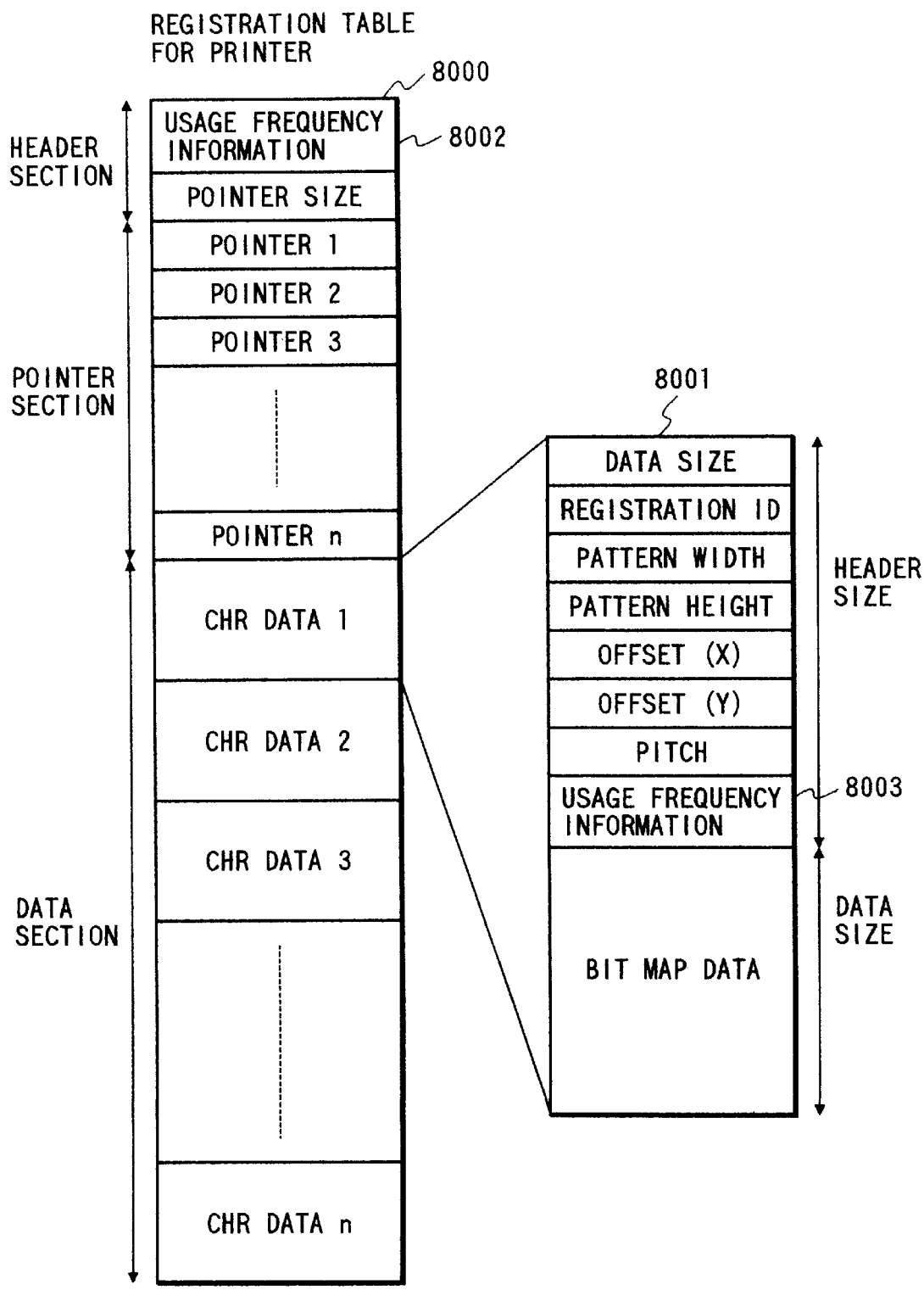
FIG. 18 is a view showing the configuration of a registration table storing the information on the usage frequency in the printer.

FIG. 18 shows the structure of the registration table of the printer, including the information on the frequency of use.

The registration table shown in FIG. 18 is same in structure as that of the first embodiment shown in FIG. 9, except for the use frequency information 8002, 8003.

The use frequency information 8002 is the information on the frequency of use per a character set, and the information 8003 is the information on the frequency of use per a character.

The registered font may be moved in the unit of a character set or a character, and the movement is made in the increasing order of the frequency of use, while respectively referring to the use frequency information 8002 or 8003.

In the present embodiment, the registered font of a low frequency of use is diverted from the volatile memory capable of high-speed access to the non-volatile memory of a lower access speed to secure a capacity on the volatile memory, whereby the new font registration can be made on such volatile memory and there can be prevented the lowering in the printing speed with the registered font.

It is also possible to enable re-use of the registered font by storing the registered font preferentially in the non-volatile memory, utilizing a fact that registered font stored in the non-volatile memory remains even after the power supply of the printer is turned off.

Also in the present embodiment, the registered fonts are moved in the increasing order of the frequency of use, but it is also possible to move the fonts in the increasing or decreasing order of the address of the registration memory, regardless of the frequency of use.

Also in the present third embodiment, the printer automatically moves the registered fonts according to the available capacity of the memories, but it is also possible to manage, in the host, the capacities of the volatile and non-volatile memories of the printer, by sending in advance the information on such capacities from the printer to the host, then to issue a command from the host to the printer for moving the registered font, and to execute the movement of the registered font in the printer according to such command.

The movement of the registered font may also be executed by at first diverting the registered font from the source of movement to the destination of movement, and, if a sufficient capacity can be reserved in the source of movement by the deletion of a registered font, returning the registered font from the destination of movement to the source of movement.

Fourth Embodiment

In a fourth embodiment of the present invention, there is provided a method of informing the host of the information of the registered font stored in the non-volatile memory 2023 such as a hard disk or a flush memory, in case the power supply of the host is once turned off and then turned on again.

Figure 19:
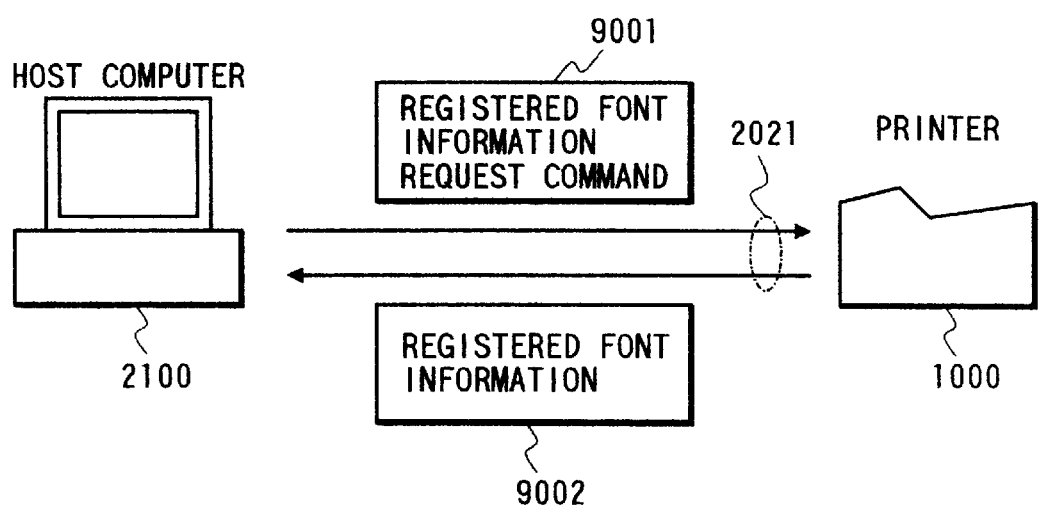
FIG. 19 is a view showing the configuration of commands between the host apparatus and the printer.

FIG. 19 shows the configuration of the present embodiment.

When the power supply of the host is turned on, the host issues a registered font information request command 9001 to the printer.

In response, the printer searches the registered font stored in the non-volatile memory 2023 in the printer and returns registered font information 9002 to the host.

Figure 20:
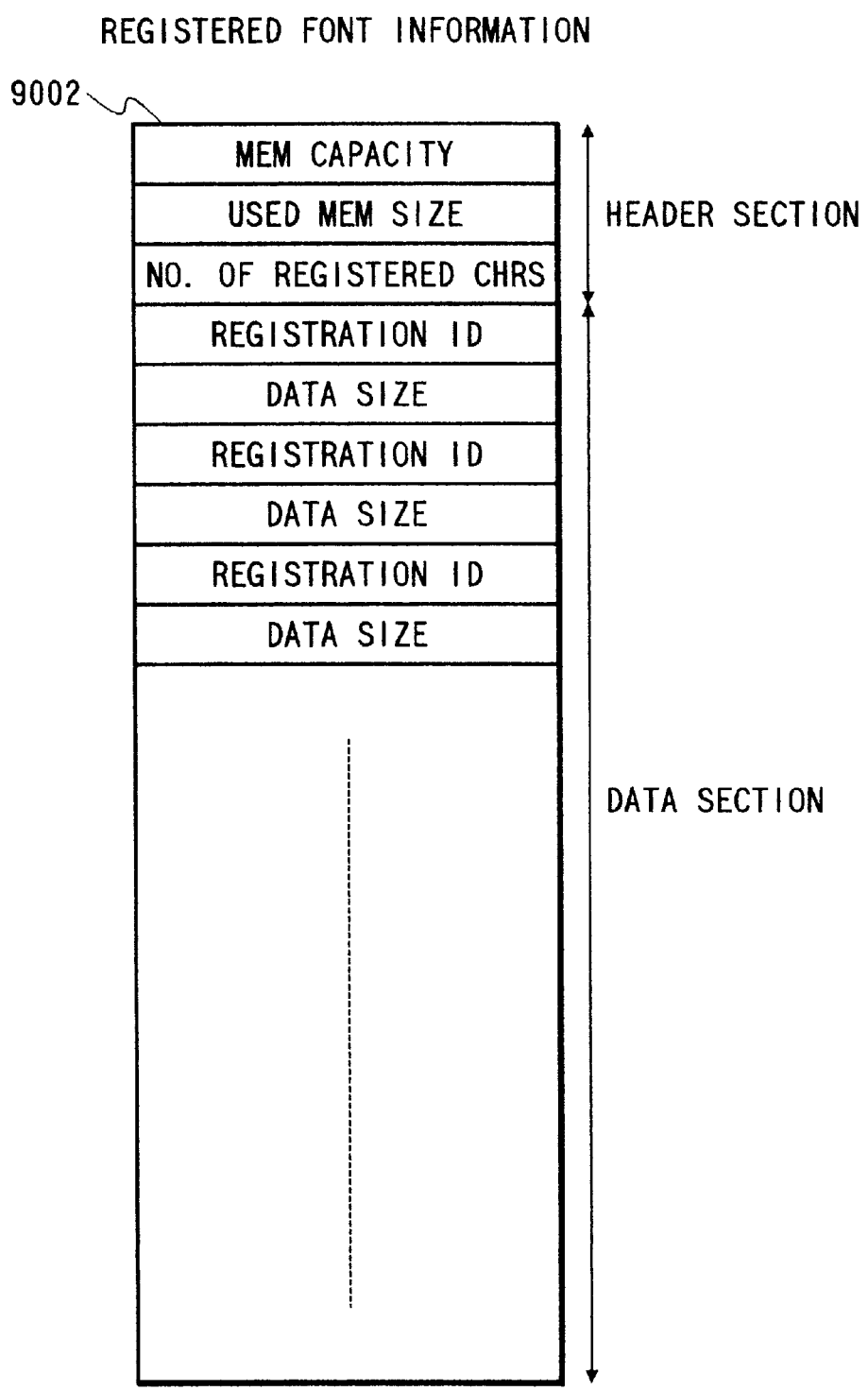
FIG. 20 is a view showing the configuration of a registered font in the printer.

FIG. 20 shows the structure of the registered font information 9002.

The registered font information 9002 contains information required for preparing the registration management table 5000 in the host, and is composed of a header section and a data section.

The header section contains the entire size of the registration memories in the printer, and the memory size and the number of registered characters, currently used for registration.

The data section is composed of data of the characters, each consisting of a registration ID and a size of the character data 4001 at the printer.

Based on the registered font information 9002, the host prepares the registration management table 5000 in the host, thereby managing the registered font as in the first embodiment.

As explained in the foregoing, the management of the registered font in the host is rendered possible by the returning of the information on the registered font stored in the non-volatile memory to the host.

Fifth Embodiment

A fifth embodiment of the present invention provides a configuration in which, in case of storing the registered font in a compressed form into the registration memory of the printer, a part of the registered font is compressed in the host and is transferred to the printer for storage in the registration memory thereof, while the remainder of the registered font is transferred, without compression in the host, to the printer and is compressed therein and stored in the registration memory.

Such sharing of the compression by the host and the printer allows to reduce the time required for such compressing operation.

Sixth Embodiment

A sixth embodiment of the present invention provides a configuration in which a table indicating the frequency of use of the characters is stored in advance in the host, and the font registration is executed in the descending order of the frequency of use, making reference to such table.

The above-explained font registration based on the use frequency table enables efficient use of the registration memory.

As explained in the foregoing, the present invention is to reserve an exclusive memory for the font registration in the printer, to execute the font registration within thus reserved memory area, or to individually reserve the registration memories according to the purpose of use of the registered fonts, thereby preventing deficiency in the registration memory and enabling efficient use of the reserved memory area.

Also the memory capable of high-speed access can be efficiently utilized by diverting and returning the registered font between the volatile memory and the non-volatile one according to the necessity.

The efficient use of the registration memory can also be achieved by executing the font registration based on the table, indicating the frequency of use of the characters, stored in the embodiment of the upper hierarchy.

Furthermore, the registered font in the printer can be managed by the equipment of the upper hierarchy.

What is claimed is:

1. A host computer to which a printer is connected, said host computer comprising:

first transmission means for transmitting to the printer a memory reservation command for reserving in the printer a character registration memory having a predetermined capacity for storing character data;

discrimination means for discriminating whether character data corresponding to a character to be printed is stored in the character registration memory;

second transmission means for transmitting to the printer identification information for the character to be printed, if said discrimination means discriminates that the character data corresponding to the character to be printed is stored in the character registration memory;

determination means for determining, in response to the predetermined capacity of the character registration memory, whether the character data corresponding to the character to be printed can be stored in the character registration memory, if said discrimination means discriminates that the character data corresponding to the character to be printed is not stored in the character registration memory;

third transmission means for transmitting to the printer a data deletion command for deleting character data stored in the character registration memory, if said determination means determines that the character data corresponding to the character to be printed cannot be stored in the character registration memory; and fourth transmission means for transmitting to the printer the character data corresponding to the character to be printer together with the identification information for the character to be printed, if said determination means determines that the character data corresponding to the character to be printed can be stored in the character registration memory.

2. A host computer according to claim 1, wherein said fourth transmission means transmits to the printer the character data corresponding to the character to be printed together with the identification information for the character to be printed and updates a registration management table for managing character data stored in the character registration memory, if said determination means determines that the character data corresponding to the character to be printed can be stored in the character registration memory, and wherein said discrimination means performs a discrimination referring to the registration management table.

3. A host computer according to claim 1, wherein said third transmission means transmits the data deletion command to the printer if said determination means determines that the character data corresponding to the character to be printed cannot be stored in the character registration memory, and then determines whether the character data corresponding to the character to be printer can be stored in the character registration memory and, in response to a negative determination result, transmits to the printer an image drawing command for drawing an image corresponding to the character to be printed.

4. A host computer according to claim 1, wherein the identification information for the character to be printed comprises a character code of the character to be printed.

5. A host computer according to claim 1, wherein the data deletion command is provided to delete character data corresponding to a character which is not a character for a page to be printed.

6. A host computer according to claim 1, wherein the printer stores the character data received from said host computer in a volatile memory and stores the character data in a non-volatile memory if the volatile memory is not available.

7. A host computer according to claim 6, wherein the printer has means for moving character data corresponding to a character used less frequently from the volatile memory to the non-volatile memory.

8. A host computer according to claim 1, further comprising:

means for sending a status request command to the printer;

means for receiving information indicative of a free memory capacity from the printer; and means for determining the predetermined capacity in response to the free memory capacity received by said receiving means.

9. A host computer according to claim 1, further comprising means for receiving from the printer information indicative of whether the character registration memory has been reserved with the predetermined capacity or with a smaller capacity than the predetermined capacity.

10. A print system comprising:

a host computer comprising:

first transmission means for transmitting to the printer a memory reservation command for reserving in the printer a character registration memory having a predetermined capacity for storing character data;

discrimination means for discriminating whether character data corresponding to a character to be printed is stored in the character registration memory;

second transmission means for transmitting to the printer identification information for the character to be printed, if said discrimination means discriminates that the character data corresponding to the character to be printed is stored in the character registration memory;

determination means for determining, in response to the predetermined capacity of the character registration memory, whether the character data corresponding to the character to be printed can be stored in the character registration memory, if said discrimination means discriminates that the character data corresponding to the character to be printed is not stored in the character registration memory;

third transmission means for transmitting to the printer a data deletion command for deleting character data stored in the character registration memory, if said determination means determines that the character data corresponding to the character to be printed cannot be stored in the character registration memory; and fourth transmission means for transmitting to the printer the character data corresponding to the character to be printer together with identification information for the character to be printed, if said determination means determines that the character data corresponding to the character to be printed can be stored in the character registration memory, wherein the printer is connected to said host computer.

11. A method for a host computer to which a printer is connected, said method comprising:

a first transmitting step of transmitting to the printer a memory reservation command for reserving in the printer a character registration memory having a predetermined capacity for storing character data;

a discriminating step of discriminating whether character data corresponding to a character to be printed is stored in the character registration memory;

a second transmitting step of transmitting to the printer identification information for the character to be printed, if it is discriminated in said discrimination step that the character data corresponding to the character to be printed is stored in the character registration memory;

a determining step of determining, in response to the predetermined capacity of the character registration memory, whether the character data corresponding to the character to be printed can be stored in the character registration memory, if it is discriminated in said discrimination step that the character data corresponding to the character to be printed is not stored in the character registration memory;

a third transmitting step of transmitting to the printer a data deletion command for deleting character data stored in the character registration memory, if it is determined in said determination step that the character data corresponding to the character to be printed cannot be stored in the character registration memory; and a fourth transmitting step of transmitting to the printer the character data corresponding to the character to be printer together with identification information for the character to be printed, if it is determined in said determination step that the character data corresponding to the character to be printed can be stored in the character registration memory.

12. A method according to claim 11, wherein said fourth transmitting step includes transmitting to the printer the character data corresponding to the character to be printed together with the identification information for the character to be printed and updating a registration management table for managing character data stored in the character registration memory, if it is determined in said determination step that the character data corresponding to the character to be printed can be stored in the character registration memory, and wherein said discrimination step includes performing a discrimination referring to the registration management table.

13. A method according to claim 11, wherein said third transmitting step includes transmitting the data deletion command to the printer if it is determined in said determination step that the character data corresponding to the character to be printed cannot be stored in the character registration memory, and then determining whether the character data corresponding to the character to be printer can be stored in the character registration memory and, in response to a negative determination result, transmitting to the printer an image drawing command for drawing an image corresponding to the character to be printed.

14. A method according to claim 11, wherein the identification information for the character to be printed comprises a character code of the character to be printed.

15. A method according to claim 11, wherein the data deletion command is provided to delete character data corresponding to a character which is not a character for a page to be printed.

16. A method according to claim 11, wherein the printer stores the character data received from the host computer in a volatile memory and stores the character data in a non-volatile memory if the volatile memory is not available.

17. A method according to claim 16, wherein the printer has means for moving character data corresponding to a character used less frequently from the volatile memory to the non-volatile memory.

18. A method according to claim 11, further comprising the steps of:

sending a status request command to the printer;

receiving information indicative of a free memory capacity from the printer; and determining the predetermined capacity in response to the free memory capacity received in said receiving step.

19. A method according to claim 11, further comprising the step of receiving from the printer information indicative of whether the character registration memory has been reserved with the predetermined capacity or with a smaller capacity than the predetermined capacity.

20. A memory medium having recorded thereon computer-code for controlling a host computer to which a printer is connected, which upon execution will cause the host computer to perform the steps comprising:

a first transmitting step of transmitting to the printer a memory reservation command for reserving in the printer a character registration memory having a predetermined capacity for storing character data;

a discriminating step of discriminating whether character data corresponding to a character to be printed is stored in the character registration memory;

a second transmitting step of transmitting to the printer identification information for the character to be printed, if it is discriminated in said discrimination step that the character data corresponding to the character to be printed is stored in the character registration memory;

a determining step of determining, in response to the predetermined capacity of the character registration memory, whether the character data corresponding to the character to be printed can be stored in the character registration memory, if it is discriminated in said discrimination step that the character data corresponding to the character to be printed is not stored in the character registration memory;

a third transmitting step of transmitting to the printer a data deletion command for deleting character data stored in the character registration memory, if it is determined in said determination step that the character data corresponding to the character to be printed cannot be stored in the character registration memory; and a fourth transmitting step of transmitting to the printer the character data corresponding to the character to be printer together with identification information for the character to be printed, if it is determined in said determination step that the character data corresponding to the character to be printed can be stored in the character registration memory.

21. A memory medium according to claim 20, wherein said fourth transmitting step includes transmitting to the printer the character data corresponding to the character to be printed together with the identification information for the character to be printed and updating a registration management table for managing character data stored in the character registration memory, if it is determined in said determination step that the character data corresponding to the character to be printed can be stored in the character registration memory, and wherein said discrimination step includes performing a discrimination referring to the registration management table.

22. A memory medium according to claim 20, wherein said third transmitting step includes transmitting the data deletion command to the printer if it is determined in said determination step that the character data corresponding to the character to be printed cannot be stored in the character registration memory, and then determining whether the character data corresponding to the character to be printer can be stored in the character registration memory and, in response to a negative determination result, transmitting to the printer an image drawing command for drawing an image corresponding to the character to be printed.

23. A memory medium according to claim 20, wherein the identification information for the character to be printed comprises a character code of the character to be printed.

24. A memory medium according to claim 20, wherein the data deletion command is provided to delete character data corresponding to a character which is not a character for a page to be printed.

25. A memory medium according to claim 20, wherein the printer stores the character data received from the host computer in a volatile memory and stores the character data in a non-volatile memory if the volatile memory is not available.

26. A memory medium according to claim 25, wherein the printer has means for moving character data corresponding to a character used less frequently from the volatile memory to the non-volatile memory.

27. A memory medium according to claim 20, further comprising the steps of:

sending a status request command to the printer;

receiving information indicative of a free memory capacity from the printer; and determining the predetermined capacity in response to the free memory capacity received in said receiving step.

28. A memory medium according to claim 20, further comprising the step of receiving from the printer information indicative of whether the character registration memory has been reserved with the predetermined capacity or with a smaller capacity than the predetermined capacity.

* * * * *

UNITED STATES PATENT AND TRADEMARK OFFICE
CERTIFICATE OF CORRECTION

PATENT NO.    : 5,995,718
DATED         : November 30, 1999
INVENTOR(S)   : KOOU HIRAIKE ET AL.

It is certified that error appears in the above-identified patent and that said Letters Patent is hereby corrected as shown below:

COLUMN 1

Line 47, "result" should read --results--.

COLUMN 4

Line 56, "are" should read --and--.

COLUMN 8

Line 53, "Judge" should read --judge--.

COLUMN 10

Line 59, "however" should read --different, however,--.

COLUMN 11

Line 27, "reversation" should read --reservation--.

COLUMN 13

Line 58, "printer" should read --printed--.

COLUMN 14

Line 12, "printer" should read --printed--.

UNITED STATES PATENT AND TRADEMARK OFFICE
CERTIFICATE OF CORRECTION

PATENT NO.    : 5,995,718
DATED         : November 30, 1999
INVENTOR(S)   : KOOU HIRAIKE ET AL.

It is certified that error appears in the above-identified patent and that said Letters Patent is hereby corrected as shown below:

COLUMN 15

Line 13, "printer" should read --printed--; and
    Line 51, "printer" should read --printed--.

COLUMN 16

Line 7, "printer" should read --printed--.

COLUMN 17

Line 6, "printer" should read --printed--; and
    Line 29, "printer" should read --printed--.

Signed and Sealed this

Sixteenth Day of January, 2001

Attest:

Q. TODD DICKINSON

*Attesting Officer*        *Commissioner of Patents and Trademarks*